United States Patent [19]
Miyake et al.

[11] Patent Number: 5,210,568
[45] Date of Patent: May 11, 1993

[54] CAMERA HAVING A CHARGING OPERATION WHICH IS INHIBITED DURING AN OPERATION OF THE CAMERA FUNCTION SECTION AND A BATTERY CHECK FUNCTION WHICH IS INHIBITED DURING THE CHARGING FUNCTION

[75] Inventors: Izumi Miyake; Kiyotaka Kaneko; Hiroshi Shimaya; Masanaga Yamamoto; Masanori Yoshida, all of Tokyo, Japan

[73] Assignee: Fuji Photo Film Co., Ltd., Kanagawa, Japan

[21] Appl. No.: 915,876

[22] Filed: Jul. 20, 1992

Related U.S. Application Data

[63] Continuation of Ser. No. 611,911, Nov. 13, 1990, abandoned.

[30] Foreign Application Priority Data

Nov. 13, 1989 [JP] Japan .................................. 1-294537

[51] Int. Cl.$^5$ ........................ G03B 7/26; G03B 15/05; G03B 17/38
[52] U.S. Cl. .................................. 354/418; 354/468; 354/484; 354/268; 354/127.1
[58] Field of Search ........... 354/127.1, 127.11, 127.12, 354/145.1, 268, 418, 468, 484

[56] References Cited

U.S. PATENT DOCUMENTS

| | | | |
|---|---|---|---|
| 4,126,874 | 11/1978 | Suzuki et al. | 354/484 X |
| 4,131,351 | 12/1978 | Iwata et al. | 354/468 |
| 4,305,649 | 12/1981 | Nagaoka et al. | 354/484 |
| 4,426,144 | 1/1984 | Kawazoe | 354/145.1 |
| 4,458,996 | 7/1984 | Harigaya et al. | 354/484 X |
| 4,470,684 | 9/1984 | Harvey | 354/145.1 X |
| 4,760,414 | 7/1988 | Tominaga et al. | 354/127.1 |
| 4,816,862 | 3/1989 | Taniguchi et al. | 354/484 X |
| 4,912,499 | 3/1990 | Desormeaux | 354/468 |
| 4,963,916 | 10/1990 | Tanaka et al. | 354/418 X |
| 4,975,721 | 12/1990 | Tominaga et al. | 354/127.1 |

Primary Examiner—W. B. Perkey

[57] ABSTRACT

In a camera having a power source shared between a charging circuit for a strobe emission and a camera function section other than the charging circuit, the charging operation is inhibited during an operation of the camera function section and a battery check is inhibited during the charging operation. As a result, a runaway of a CPU of the camera due to the voltage reduction of the power source in the charging operation is avoided; moreover, inhibition of a shooting operation due to the battery check is prevented, thereby efficiently utilizing the battery capacity.

7 Claims, 3 Drawing Sheets

CAMERA HAVING A CHARGING OPERATION WHICH IS INHIBITED DURING AN OPERATION OF THE CAMERA FUNCTION SECTION AND A BATTERY CHECK FUNCTION WHICH IS INHIBITED DURING THE CHARGING FUNCTION

This application is a continuation of application Ser. No. 07/611,911 filed on Nov. 13, 1990, now abandoned.

BACKGROUND OF THE INVENTION

1. Field of the Invention

The present invention relates to a camera in which a charging operation of a charging circuit for a strobe emission and an operation voltage supply to a functional section, other than the charging circuit, achieving characteristic operations of the camera are accomplished by use of a common power source.

2. Description of Related Art

When conducting a shooting operation by use of a camera in a room, strobe photography employing a strobe emission is adopted to attain an appropriate level of exposure.

On the other hand, when a battery driving a camera is used up and hence the battery cannot develop a sufficient voltage, a control unit of the camera may possibly achieve an abnormal operation. To cope with this disadvantage, the battery is appropriately subjected to a battery check such that when the battery voltage does not exceed a predetermined reference voltage, a shooting sequence of the camera is inhibited.

While the charging circuit for the strobe emission is under a charging operation, a voltage drop takes place in the battery. On the other hand, the control unit of the camera, particularly, a control unit provided with a central processing unit (CPU) accomplishes operations thereof only when powered with a voltage not below a predetermined voltage. If the voltage supplied to the CPU is below the predetermined voltage (less than the reference voltage set for the battery check), there exists a fear that a runaway may occur during the operations thereof. Consequently, in a camera in which the charging operation of the strobe charging circuit and the operation to supply the operating voltage to the control unit of the camera are carried out by use of a common battery unit in a shared manner, even when the battery unit develops a sufficient voltage for these operations, the runaway of the control unit may take place during the charging operation of the charging circuit for the strobe emission. Moreover, when a battery check is accomplished during the charging operation above, the shooting sequence may possibly be inhibited. In this situation, even when the battery has a satisfactory voltage, the shooting operation of the camera cannot be achieved.

SUMMARY OF THE INVENTION

It is therefore an object of the present invention to provide a camera capable of appropriately conducting both the charging operation of the charging circuit for the strobe emission and the operation of the control unit including an execution of a normal shooting sequence.

In accordance with the present invention, there is provided a camera comprising a power source commonly used between a charging circuit for a strobe emission and a camera function section thereof other than the charging circuit, battery check means for accomplishing a battery check on the power source, and means for inhibiting a shooting operation when the battery check means detects that a voltage produced from the power source is equal to or less than a predetermined value. The camera includes processing detect means for detecting an initiation and a termination of an operation of the camera function section, inhibit means for inhibiting the power source from charging the charging circuit during a period of time from when the processing detect means detects the operation initiation of the camera function section to when the detect means detects the operation termination thereof, charging detect means for detecting a state in which the charging is being achieved to the charging circuit, and battery check inhibit means for inhibiting the battery check means from accomplishing the battery check when a charging operation to the charging circuit is being detected by the charging detect means.

In accordance with the present invention, the charging operation is inhibited while the function section other than the charging circuit is operating in the camera, which thereby avoids an abnormal voltage drop of the power source associated with the charging operation. As a result, the runaway of the control unit is prevented and the normal operation of the camera is guaranteed. In the charging operation, since the battery check of the power supply is inhibited, even when a voltage drop of the power supply may occur in relation to the charging operation to the charging circuit, the shooting operation is not inhibited.

A description will now be given in detail of an embodiment in which the present invention is applied to a still video camera (an electronic still camera) recording a video signal representing an object shot by the camera on a video floppy (magnetic) disk. However, the present invention is not limited to the still video camera, namely, the present invention can be naturally applied to any camera in which the charging operation to the strobe charging circuit and a driving operation of the camera function section other than the charging circuit are accomplished by use of a common power source, for example, to a camera employing a film optically sensitive to an object shot by the camera.

The foregoing and other objects, advantages, manner of operation, and novel features of the present invention will be understood from the following detailed description when read in connection with the accompanying drawings.

DESCRIPTION OF THE PREFERRED EMBODIMENTS OF THE PRESENT INVENTION

Figure 1:
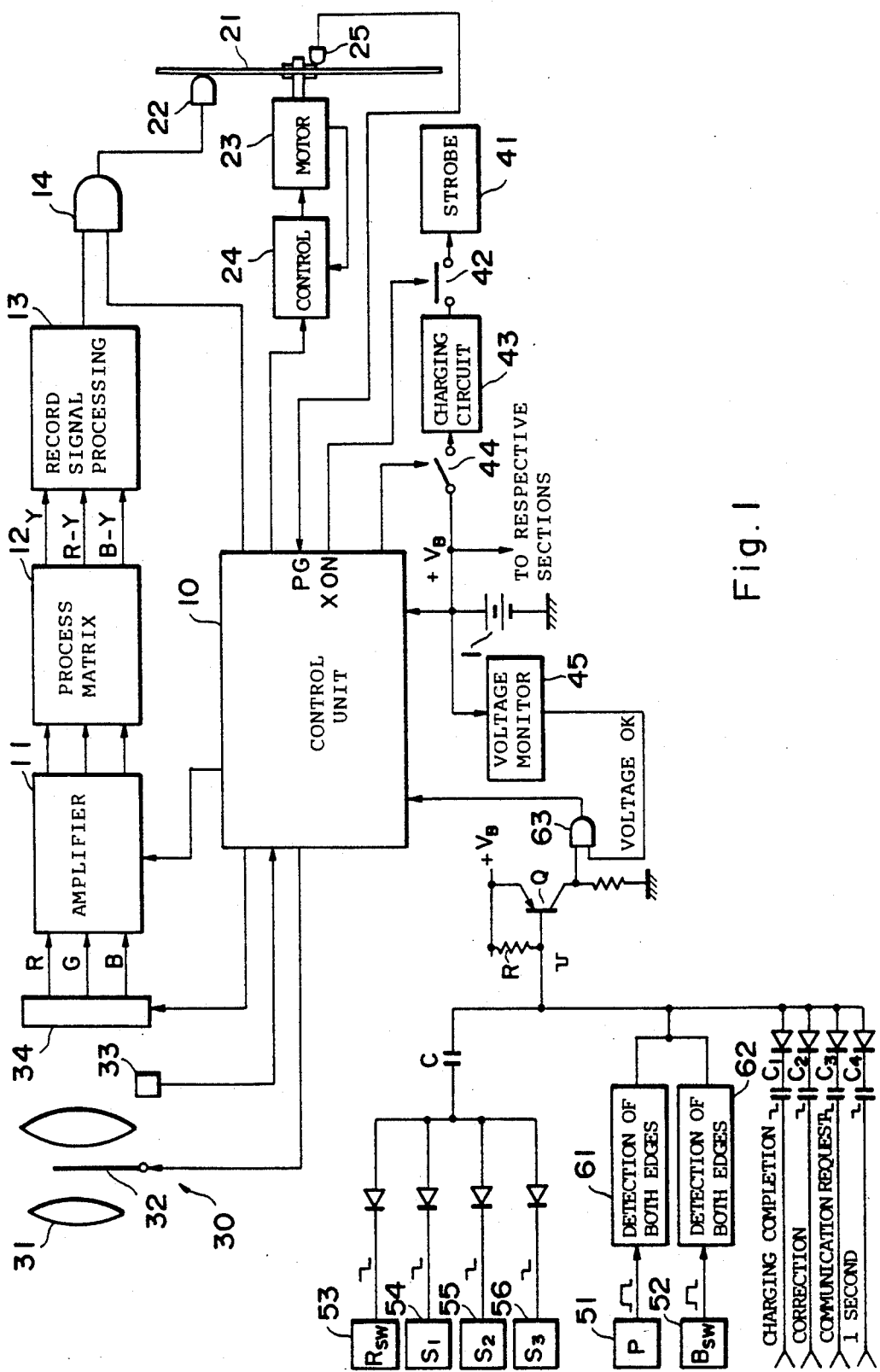
FIG. 1 is a schematic block diagram showing an electric constitution of a still video camera in an embodiment in accordance with the present invention.

FIG. 1 shows a part of an electric configuration of a still video camera in an embodiment according to the present invention.

The still video camera includes a control unit 10 for controlling the overall operation of the still video camera. The control unit 10 includes such elements as a CPU, a memory, and an interface circuit. The control unit 10 takes an operating or operable state and a stop mode state. Namely, in the operating state, the system achieves processing for a camera function other than a charging function to charge a charging circuit 43 for an emission of a strobe 41; whereas, the stop (standby) mode state is a state other than the operating state. The control unit 10 can conduct operations such as an acceptance of an interruption in the stop mode.

The still video camera is provided with a power source 1 to drive the entire system of the camera, namely, the power is supplied to the respective components of the camera including the control unit 10. The power supply 1 also charges up the charging circuit 43 disposed to perform an emission of the strobe 41.

In this still video camera, the control unit 10 conducts a battery check on the power source 1. When the voltage of the power source 1 is lowered, even if a shutter release button 53 is depressed, a normal shooting operation cannot be accomplished. As a consequence, the control unit 10 monitors the voltage of the power source 1 such that when the voltage becomes to be equal to or less than a preset value (e.g. 5.6 V), the shooting operation is inhibited.

The system includes an imaging optical system 30 including an imaging lens system 31 for obtaining a focused image of an object and an iris 32. The optical system 30 includes a light measuring element 33 producing a signal representing a measured intensity of light so as to feed the signal to the control unit 10. The iris 32 sets its opening under control of the control unit 10.

In a focal plane of the optical system 30, a solidstate imaging device 34 such as a charge-coupled device 34 is arranged. The imaging device 34 includes light receiving elements associated with three principle colors of red (R), green (G), and blue (B). Video data of an object focused on the imaging device 34 is read therefrom in a form of video signals of three colors at a timing synchronized with a synchronization signal supplied from the control unit 10 thereto. The obtained color signals are passed via a preamplifier circuit (not shown) and a variable gain amplifier circuit (color balance adjuster circuit) 11 to a process matrix circuit 12. In response to the received signals, the process matrix circuit 12 generates a luminance signal Y and two color difference signals R−Y and B−Y, which are then fed to a record signal processing circuit 13 including a line sequencing circuit, a preemphasis circuit, a frequency modulation circuit, a mixing circuit, etc. The signal processing circuit 13 produces a mixed or composite video signal which has undergone the frequency modulation to pass the signal to a gate circuit 14 controlling a recording operation.

The configuration of FIG. 1 further includes a video floppy disk 21, which is driven into a rotation by a disk motor 23. The disk motor 23 rotates at a constant rotary speed, for example, at 3600 revolutions per minute (rpm) under control of a servo control circuit 24, which is also responsive to instructions from the control unit 10 to start and to stop the motor 23.

The video floppy disk 21 is brought into contact with a recording magnetic head 22. The floppy disk 21 has a core, which is positioned in the neighborhood of a phase detector 25 producing a phase detection pulse PG for each revolution of the video floppy disk 21. The magnetic head 22 is moved by a feeding or transporting mechanism thereof in a radial direction of the video floppy disk 21 to be positioned on a predetermined track of the disk 21. The phase detection pulse PG is delivered to the control unit 10.

The solid-state electronics imaging device 34 accumulates signal charge for a period of time instructed by the control unit 10. That is, the still video camera is provided with an electronic shutter system in which an arbitrary shutter open period of time can be set by controlling the signal charge accumulating period of time in the light receiving section of the imaging device 34. As a consequence, an exposure control is accomplished depending on a shutter speed and the magnitude of the iris opening.

The configuration further includes, in addition to the strobe (discharge tube) 41 for strobe photography and the charging circuit 43 for accumulating therein electric charge to supply a current driving the strobe 41, a strobe switch 42 for allowing the current to be fed from the charging circuit 43 to the strobe 41 for an emission of light and a strobe charging switch 44 for applying a voltage from the power supply 1 to the charging circuit 43. The charging circuit 43 includes a circuit for detecting a condition that the charged voltage reaches a predetermined value so as to produce a charging completion signal. The switches 42 and 44 turn on and off under supervision of the control unit 10.

Whether or not the charging operation is being conducted onto the charging circuit 43 can be judged as follows, for example. Namely, the control unit 10 can recognize the condition by itself based on the on/off control thereof on the strobe charging switch 44. When the charging circuit 43 is being subjected to the charging operation, namely, when the control unit 10 keeps the strobe charging switch 44 in the on state, the control unit 10 inhibits the battery check from being achieved on the power source 1.

The power source 1 is connected to a voltage monitor circuit 45, which monitors the voltage of the power supply 1 to produce an O.K. signal only when the voltage is not less than a preset voltage (e.g. 4.5 V). The O.K. signal is then delivered to one of the two inputs of an AND gate 63. The preset voltage (4.5 V) is obtained by adding an appropriate voltage allowance to the minimum voltage at which the control unit 10 can carry out the normal operation.

The still video camera includes a power source switch 51, a bucket switch 52 for detecting an open-/close state of a bucket for accommodating therein the video floppy disk 21 (and presence or absence of the video floppy disk 21, if necessary), the shutter release button 53, and other various switches 54 to 56. The power switch 51 and the bucket switch 52 pass therethrough signals, which respectively are sent via both-edge detector circuits 61 and 62 and a transistor Q to the other one of the two inputs of the AND gate 63. With this provision, as described above, if the voltage of the power source 1 is not less than the predetermined voltage (4.5 V) and hence the voltage monitor circuit 45 creates the O.K. signal, the signals respectively passing through the power switch 51 and the bucket switch 52 are delivered as interruption signals to the control unit 10.

Each of the shutter release button 53 and the switches 54 to 56 are disposed to supply an interruption signal to the control unit 10 when depressed under the following condition. Namely, if the voltage of the power supply 1 is not below the predetermined voltage at the depression, owing to a pull-up resistor R connected to the power supply, the interruption signal is sent via the transistor Q and the AND gate 63 to the control unit 10. Among the switches 54, 55, and 56 is also included a switch (a switch to be manually activated or a switch to be turned on in response to a setting operation of the strobe 41) for inputting a strobe charging instruction. Moreover, the control unit 10 receives as interruption signals thereto such signals attained or generated in association with various functions of the camera as a charging completion signal from the charging circuit 43 of the strobe 41, a correction signal of a clock of the still video camera, a communication request signal from an external device, and a one-second signal for a calendar (clock) function.

In an ordinary situation, the control unit 10 is set to the stop mode in which the internal memory thereof is in a backup state and the interruption signals can be accepted. Furthermore, the operation to charge the charging circuit 43 of the strobe 41 is permitted only when the control unit 10 is in the stop mode. In this mode, when an interruption signal is received from any one of the switches such as the power switch 51 and the switches 52 to 56, the control unit 10 is set to the operating state. In the operating state, the control unit 10 accomplishes the battery check of the power source 1 at an appropriate point of time or at a predetermined interval to confirm whether or not the operations of the camera including the shooting sequence can be normally achieved. In addition, the control unit 10 turns the strobe charging switch 44 off to inhibit the charging operation from being carried out on the charging circuit 43 of the strobe 41.

When the power switch 51 is turned on, a pulse signal is generated to be delivered to the both-edge detector circuit 61, which in turn produces an edge detection pulse. When the edge detection pulse is fed to a base of the transistor Q, a signal is supplied to an input terminal of the AND gate 63 of which another input terminal is provided with the output O.K. signal from the voltage monitor circuit 45. Namely, only when the power source 1 develops a voltage not less than the preset voltage (4.5 V), the signal above is delivered as an interruption signal via the AND gate 63 to the control unit 10, thereby appropriately executing processing associated with various functions of the camera.

Also when the bucket switch 52 is turned on, the both-edge detector circuit 62 similarly creates an edge detection pulse. In this situation, if the voltage of the power supply 1 is equal to or more than the preset value, an interruption signal is fed to the control unit 10, which hence changes its state from the stop mode state into the operating state.

Signals obtained in association with various functions of the camera such as a charging completion signal produced from the charging circuit 43 at a charging completion, a correction signal of a clock disposed in the still video camera, a communication request signal from an external device linked with the still video camera, and a 1-second signal for a calendar function are respectively supplied to capacitors $C_1$ to $C_4$. Each of the capacitors $C_1$ to $C_4$ constitutes a differentiation circuit together with the pull-up resistor R connected to the power source 1. For each signal above, in response to an edge appearing at a transition of the signal level from a level H to a level L, a pulse is generated to be sent as an interruption signal via the AND gate 63 to the control unit 10.

Lines connected to the shutter release button 53 and the switches 54 to 56 are set to a level H due to the pull-up resistor R connected to the power source 1. When any one of the switches 53 to 56 is depressed or is turned on, the voltage applied to the line connected to the depressed switch is varied from the level H to the level L. Thereafter, the differentiation circuit including the capacitor C and the pull-up resistor R generates a pulse signal, which is then transmitted as an interruption signal via the AND gate 63 to the control unit 10.

Also for inputs of the strobe charging completion signal, the clock correction signal, the communication request signal from an external device, and the 1-second signal of the calendar, the associated differentiation circuits respectively including the related capacitors $C_1$ to $C_4$ and the pull-up resistor R produce associated pulses, which are then fed as interruption signals via the AND gate 63 to the control unit 10. As a result, the control unit 10 in the stop mode is set to the operating state.

Figure 2:
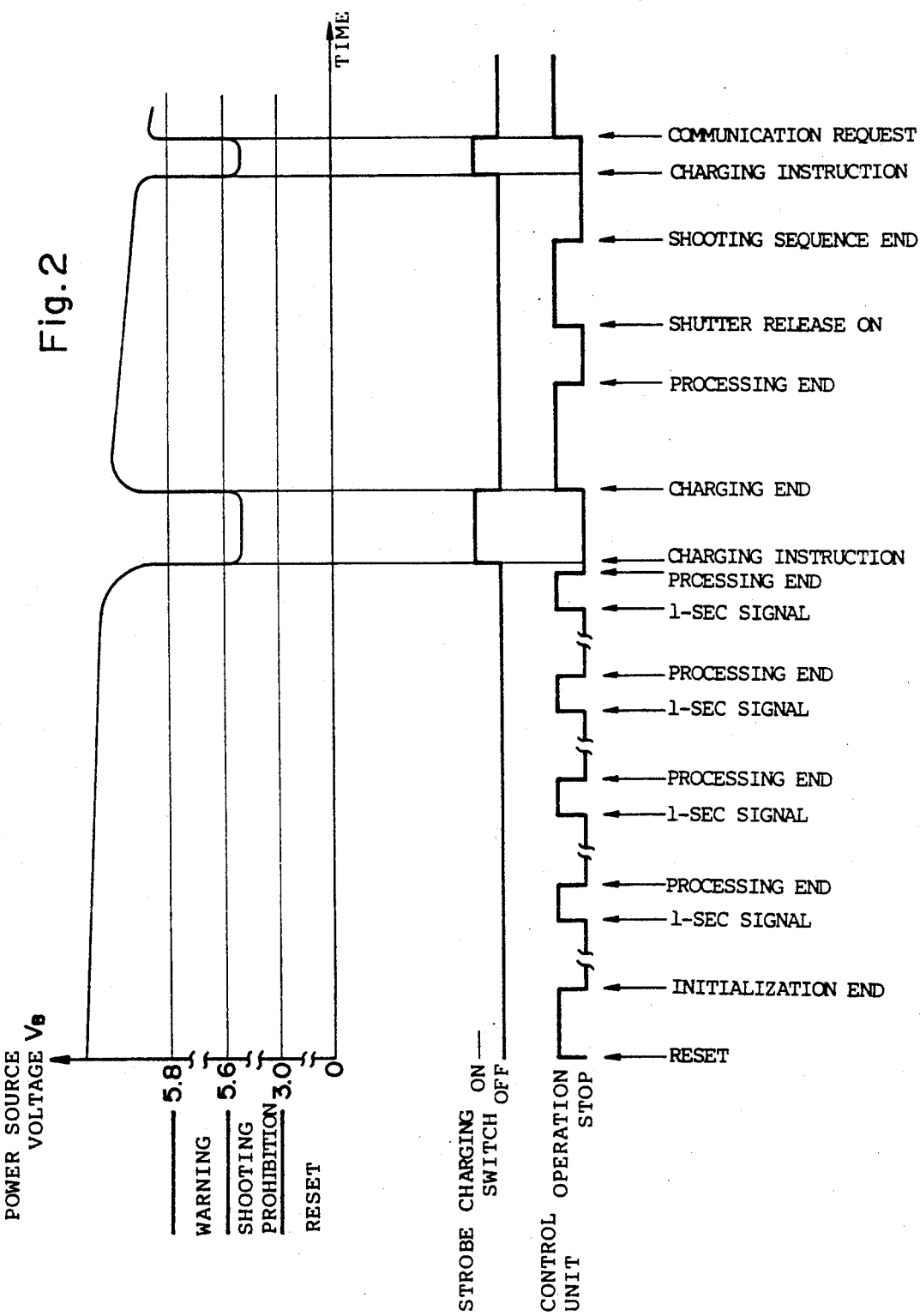
FIG. 2 is a signal timing chart showing relationships between an operation state of a control unit, a strobe charging switch, and a power supply voltage.

FIG. 2 shows relationships between the operating state of the control unit 10, the state of the strobe charging switch 44, and the voltage $V_B$ of the power supply 1. As can be seen from the signal timing chart of FIG. 2, the control unit 10 is reset when the power supply voltage becomes to be equal to or less than 3 volt. This is because when the power supply voltage does not exceed 3 V, the runway of the control unit 10 may possibly occur. The shooting processing (sequence) is prohibited in a zone of 3 V–5.6 V. The warning of replacement of the power source (battery)1 appears on the display unit and so on in a zone of 5.6 V–5.8 V. The normal operation of the camera is guaranteed in a voltage range not below 5.8 V.

Figure 3:
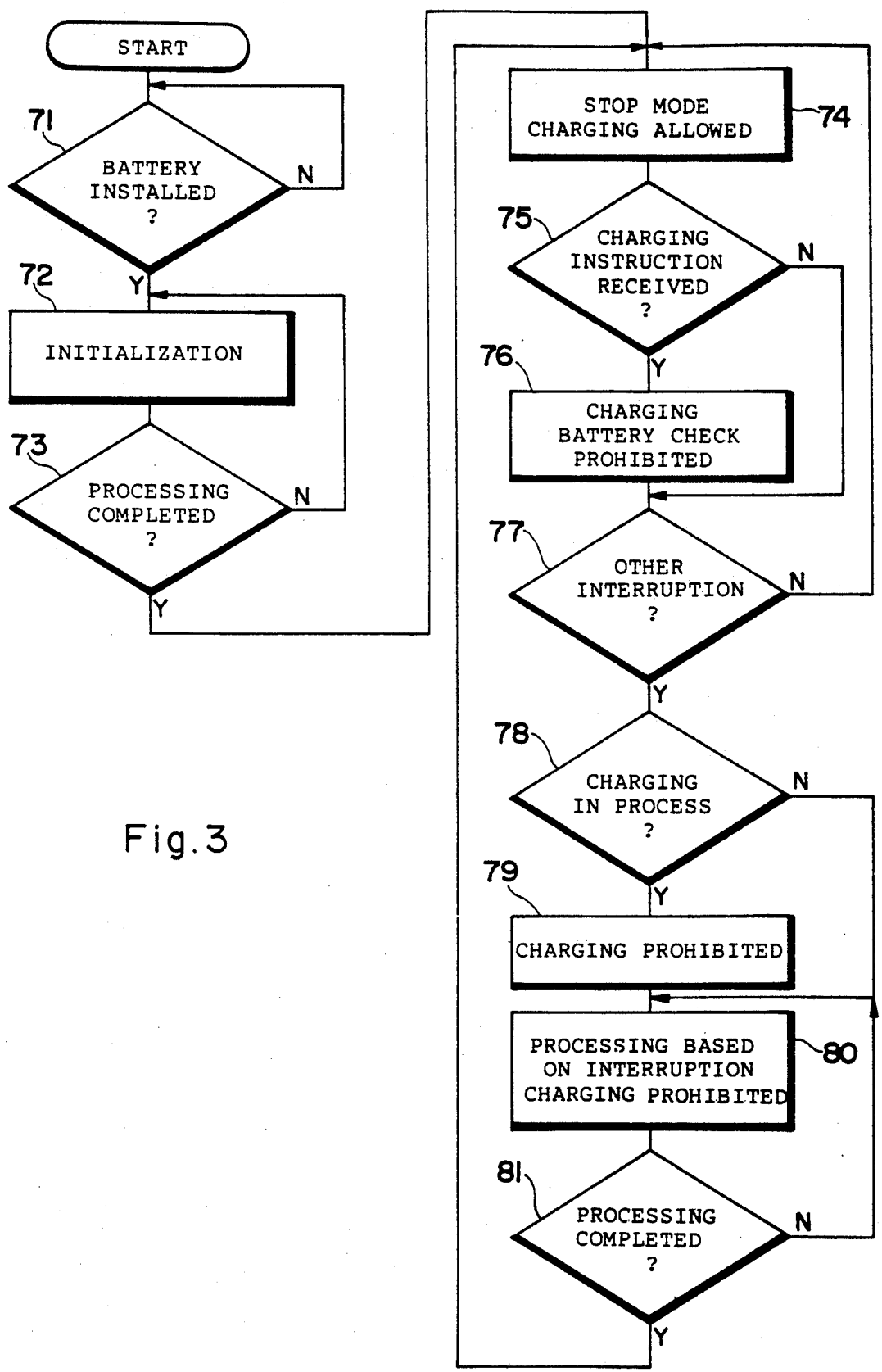
FIG. 3 is a flowchart showing a processing procedure employed in the control unit.

FIG. 3 is a flowchart showing a processing procedure of the control unit 10.

When the power supply (battery) 1 is installed in the apparatus, the control unit 10 undergoes a reset and start sequence to conduct initialization processing, for example, a random access memory (RAM) included in the control unit 10 is cleared and input/output ports are set to predetermined states, respectively (steps 71 and 72). When the initialization is completed (the step 73 results in YES), the control unit 10 is set to the stop mode. The charging operation onto the charging circuit 43 is allowed when the control unit 10 is in the stop mode (step 74).

If the control unit 10 has not received a charging instruction of the charging circuit 43 by an interruption (step 75 results in NO), the system checks for presence or absence of other interruptions (step 77). The still video camera is provided with a calender function. As a result of this provision, a signal is generated at a one-second interval to cause an interruption in the control unit 10, which thereby enters the operating state. In this situation, if the charging operation is not being executed on the charging circuit 43 (step 78 results in NO), processing such as a count operation is executed to achieve the calendar function (step 80). When the processing is completely accomplished, the control unit 10 returns again to the stop mode (step 81 ends with YES; step 74).

In the stop mode (step 74), when an interruption signal denoting a charging instruction is received (YES is attained in a step 75), the strobe charging switch 44 is turned on and then the power source 1 initiates a charging operation onto the charging circuit 43. In addition, during the charging operation, the battery check is inhibited (step 76). When the charging operation is in process, a voltage drop takes place in the power supply 1 as shown in FIG. 2. The voltage may be decreased to a value not exceeding 5.6 volt in some cases; however, since the battery check is not executed because of the inhibition, the shooting operation cannot be prevented. At the completion of the charging operation onto the charging circuit 43, the charging circuit 43 delivers a charging completion signal as an interruption signal to the control unit 10 (the step 77 concludes with YES). As a result, the control unit 10 is set to the operating state and then displays a message of the charging completion on a display device such as a liquid-crystal display (LCD) panel, not shown (the step 78 results in NO; step 80).

When the user depresses the shutter release button 53, the control unit 10 enters the operating state to accomplish a predetermined shooting sequence such as an operation to record data on the video floppy disk 21. At the end of the shooting sequence, the control unit 10 is again set to the stop mode.

In the stop mode, on receiving the charging instruction, the control unit 10 turns the strobe charging switch 44 on so as to start charging the charging circuit 43. Before the charging operation is finished, if an interruption signal such as a communication request is received from an external device, the control unit 10 is set to the operating state and then the strobe charging switch 44 is turned off to inhibit the charging operation from being carried out onto the charging circuit 43 (steps 77, 78, and 79). As a result, the voltage $V_B$ of the power supply 1 rises up, which consequently avoids the undesirable phenomena, which may possibly result from the reduction of the power supply voltage, such as the runaway and abnormal operations of the control unit 10. In other words, during an interruption processing initiated in response to an interruption, the charging of the charging circuit 43 is inhibited, thereby guaranteeing a normal interruption processing in any case.

As many apparently widely different embodiments of the present invention can be made without departing from the spirit and scope thereof, it is to be understood that the invention is not limited to the specific embodiment thereof except as defined in the appended claims.

What is claimed is:

1. A camera having a battery check function comprising:
    a power source commonly used for a charging circuit associated with a strobe emission and a camera function section other than the charging circuit;
    battery check means for achieving a battery check on said power source;
        shooting operation inhibiting means for inhibiting a shooting operation when said battery check means detects that a volatage outputted from said power source is equal to or less than a predetermined value;
    processing detect means for detecting an initiation and a termination of an operation of said camera function section;
    power source inhibiting means for inhibiting said power source from charging said charging circuit during a period of time from when said processing detect means detects the initiation of said camera function section to when said processing detect means detects the termination thereof;
    charging detect means for detecting a state in which the charging is being conducted onto said charging circuit;
    battery check inhibiting means for inhibiting said battery check means from accomplishing the battery check while a charging operation onto said charging circuit is being detected by said charging detect means; and
    control means for causing said power source inhibiting means to inhibit said power source from charging said charging circuit until a camera function processing is completed and for causing said camera function section to execute a requested camera function processing when a camera function is requested while said charging detect means is detecting the state in which the charging is being conducted onto said charging circuit.

2. A camera in accordance with claim 1, wherein said charging circuit is only charged during a standby mode and said power source is used for said camera function section in an operating state.

3. A camera in accordance with claim 1, wherein said shooting operation is inhibited when said voltage outputted from said power source is equal to or less than said predetermined value of 5.6 V.

4. A method of operating a camera having a power source commonly used for a charging circuit associated with a strobe emission and a camera function section other than the charging circuit, battery check means for achieving a battery check on said power source, shooting operation inhibiting means for inhibiting a shooting operation when said battery check means detects that a voltage outputted from said power source is equal to or less than a predetermined value, and a control unit for conducting a control operation to achieve various functions of the camera, comprising the steps of:
    setting the control unit in a standby state in which an interruption signal can be accepted;
    changing a state of the control unit responsive to the interruption signal denoting a processing start of said function of the camera from the standby state to an operating state;
    allowing, by means of the control unit, the charging operation to be achieved onto the charging circuit;
    initiating, by means of the control unit in response to a reception of the interruption signal designating a charging instruction, the charging operation onto the charging circuit and inhibiting the battery check means from accomplishing the battery check;
    stopping, by means of the control unit in response to a reception of the interruption signal designating an instruction other than the charging instruction, the charging operation being achieved onto the charging circuit, if the charging operation is being executed; and
    inhibiting, by means of the control unit in response to a reception of the interruption signal designating an instruction other than the charging instructions, the charging operation from being achieved onto the charging circuit and executing processing based on the received interruption signal.

5. A method in accordance with claim 4 wherein the control operation is returned to the standby mode when the interruption signal indicating a completion of the charging operation is received.

6. A method in accordance with claim 4, wherein said charging circuit is only charged during said standby state and said power source is used for said camera function section in said operating state.

7. A method in accordance with claim 4, wherein said shooting operation is inhibited when said voltage outputted from said power source is equal to or less than said predetermined value of 5.6 V.

* * * * *